United States Patent Office 3,536,689
Patented Oct. 27, 1970

3,536,689
DENSIFICATION OF POLYOLEFINS
Stanley H. Brand and Doyle R. Wise, Texas City, Tex., assignors to Monsanto Company, St. Louis, Mo., a corporation of Delaware
No Drawing. Filed Apr. 24, 1968, Ser. No. 723,938
Int. Cl. C08f 47/00
U.S. Cl. 260—41                                   7 Claims

ABSTRACT OF THE DISCLOSURE

Method for increasing throughput capacity and temperature control in a continuous mixer wherein densification of a polyolefin powder is effected in the presence of a liquid such as water by adding to the polyolefin powder being densified a specified amount of particles of a polyolefin of a specified size larger than the size of the powder particles.

BACKGROUND OF THE INVENTION

This invention relates to the conversion of a powdered or pulverulent solid form of a polyolefin having a low-bulk density to a heat-plastified or densified form having relatively high bulk-density. More particularly, it relates to a method of increasing the throughput capacity and control of a continuous mixer used in densifying polyolefins in the presence of vaporizable liquids.

Polyolefins are often obtained in the form of fluffy powders having low-bulk density. The term "bulk density" of a powder or granular material refers to the weight per unit of total volume of a bed of the particulate material, the voids in and between the solid particles generally being filled with air at atmospheric pressure. For example, the bulk density of polyethylene powder obtained via the so-called "Ziegler process" may range from 2 to 20 lb./ft.$^3$ depending on the conditions of its preparation whereas the true density of the polymer is of the order of 55 to 61 lb./ft.$^3$. In low-bulk density powders of his kind, from 60 to more than 95% of the apparent volume consists of voids filled with air.

In order to utilize low-bulk density powder or granulated solid polyethylene for the purpose of thermally shaping the polymeric solid into useful articles, e.g., by injection molding, extrusion, or the like, it is necessary to melt the polymer solid particles to remove the air from the voids and to fuse the polymer particles into a homogeneous heat-plastified mass that is substantially free of gas voids. This melting process generally known as "densification" is usually carried out in a mixing device in which the powdered polymer is kneaded at a temperature sufficiently high to cause fusion. Since this densification process is usually carried out in the presence of air, the polymer is subjected to oxidative degradation, which often results in impaired physical properties.

To aid in overcoming this problem, the densification is carried out in the presence of a liquid, vaporizable at the temperature of fusion of the particular polyolefin. This liquid, sometimes known as a heat-transfer liquid, has a two-fold purpose in that it aids uniform heating of the powder and serves, on vaporizing, to displace air from the mixer thereby preventing or retarding oxidation of the polyolefin. However, the presence of such a liquid in a system where the powder is being densified in a continuous mixer poses significant problems. For example the use of water as the liquid in the densification of polyethylene powder has been found to result in a severely curtailed throughput rate of powder and leads to inability to adequately control the stock temperature, i.e., the temperature of the molten polymer leaving the mixer. The latter factor is quite important in order that the physical properties be maintained.

SUMMARY

It is, therefore, an object of the present invention to provide an improved method for the densification or heat-plastification of polyolefin powder in the presence of a vaporizable liquid.

It is a further object of the present invention to provide a method for increasing the throughput capacity of a continuous mixer used for densifying polyolefin powders in the presence of vaporizable liquids such as water. Still another object of the present invention is to provide a method whereby the melt temperature of the product issuing from a continuous mixer may be controlled over a broader range.

These and other objects of the present invention which will be apparent from the detailed description given herein and the appended claims are attained by adding to a polyolefin powder being fused and densified in a continuous mixer in the presence of a vaporizable liquid, particles of a polyolefin having a size greater than that of the polyolefin powder.

DESCRIPTION OF THE PREFERRED EMBODIMENT

The invention is demonstrated by the following examples which are not to be construed in any manner as a limitation of the scope thereof. As used herein, the term "powder" refers to a particulate polyolefin having a size such that it passes through a 60-mesh U.S. standard sieve. The term "particles" which is more fully described below refers generally to small pieces of the polyolefin resin which are larger than the above-described powder, such that they are retained on a 60-mesh U.S. standard sieve. The continuous mixer used in the examples was a small production-sized unit manufactured by the Farrel Corporation, Ansonia, Conn., and was contained in a typical production-line arrangement. It had a rotor diameter of 4 inches. In a continuous mixer as opposed to a "batch" mixer the ingredients to be blended or fused, etc., are uniformly fed into a hopper at one end and steadily discharged from the other end. The polymer can be fed continuously or intermittently via a high-speed, batch-scale dumping technique whereby a charge of polymer is fed every 15–20 seconds or less. In the case of a polyolefin powder, for example, the material goes in as a fluffy low bulk-density powder and exits from the mixer as a continuous strip of molten polymer. The molten mass is then delivered to a conventional extruder for further processing to pellets or the like.

EXAMPLE 1

A polyethylene resin powder prepared via the Ziegler process and having a bulk density of about 16 lb./ft.$^3$ was continuously fed to the continuous mixer using a Wallace and Tiernan gravimetric feeder. Water was added to the mixer at a rate such that its concentration therein was maintained at 1.0% by weight of the powder fed. The following conditions on the continuous mixer were used: rotor r.p.m. 500, horsepower 72, orifice opening 1.78 inches. The maximum throughput rate of powder obtainable was found to be 380 lb./hr. Furthermore, the lowest stock temperature possible was about 200° C.

EXAMPLE 2

The procedure of Example 1 was repeated using essentially the same operating conditions. Previously densified polyethylene particles which in this case were polyethylene pellets having a cylindrical shape and an average diameter of about 0.100 inch with a L/D of about 1 were continuously added to the mixer at a rate so as to constitute 7.5% by weight of the combined powder and water being fed to the mixer, the water content being maintained at 1.0% by weight. The throughput rate of powder was increased over that of Example 1 to 610 lb./hr. This represents a greater than 60% increase in rate. Furthermore, it was possible to adjust the temperature of the molten mass to 175° C., 25 degrees lower than in Example 1.

As the above examples clearly indicate, the use of the present invention results in a drastic increase in the amount of powder which can be processed, i.e., densified per unit time. In large plant-scale operations, the advantages of the latter can be easily seen. The continuous particle addition also allows control of the stock temperature over a broader range. The ability to control the stock temperature is quite critical inasmuch as excessively high temperatures leads to a general deterioration of the physical properties of the polymer due primarily to oxidation and, in extreme cases, cross-linking.

The present invention has been described with reference to polyethylene powder prepared via the Ziegler process; however, it is to be understood that it is applicable to other powdered low-bulk-density polyolefins having melt indexes ranging from 0.001 to 50, as, for example, Ziegler-prepared polypropylene, Ziegler-prepared copolymers of ethylene and other polymerizable monomers such as alphaolefins. Examples of the latter include ethylene copolymers of butene-1, pentene-1, hexene-1 and the like. In general, the present invention is applicable to any polyolefin powder wherein the bulk density is from 2 to 20 lb./ft.$^3$ and higher and especially 11 to 20 lb./ft.$^3$ and having a size such that it passes through a 60-mesh U.S. standard sieve.

It is not necessary in practicing the present invention that the particles of the polyolefin added be the same as the powder being densified. For example, the particles could be polypropylene and the powder polyethylene homopolymer or an ethylene copolymer or vice versa. The process is particularly applicable to the densification of powdered ethylene homopolymers and copolymers produced via the Ziegler process. When the polyolefin powder being densified is polyethylene, it is preferred that the particles added be polyethylene also.

The amount of particles added can range from about 0.5 to about 30% by weight of the powder fed to the mixer with amounts of from 3 to 25% normally preferred. The latter range is especially preferred when both the powder and particles are polyethylene. The particles can be added either continuously or intermittently at equal intervals in small charges, the only requirements being that their concentration in the mixer be maintained at a fairly constant level. The particles of polyolefin added which preferably comprise previously densified particles of polyolefin can be regularly or irregularly shaped. The size of the particles of the polyolefin added must be large enough such that they are retained on a 60-mesh U.S. standard sieve. It is preferred in practicing the present invention to use particles commonly referred to as "pellets," i.e., polyolefin resin which has been extruded in the form of a continuous strand having a circular cross-section and cut into small segments to form cylindrically shaped pieces having diameters of from about 0.070 to 0.130 inch and a $L/D$ of from about 0.5 to 2.0. Pellets having the shapes of cubes and spheres can also be used with equally good results.

The liquid used in the process should be vaporizable at the temperature at which the polymer undergoes fusion. While the preferred liquid is water, other liquids can also be employed as, for example, mixtures of water and a glycol such as ethylene glycol. Other polar liquids such as the lower aliphatic alcohols either alone or mixed with water can also be employed. Suitable alcohols include methanol, ethanol, propanol and the like. The amount of the liquid can range from about 0.1 to about 10% by weight of the powder being fed to the mixer. It is preferred, however, to use from about 0.5% to about 2% by weight.

The temperature at which the polymer densification is carried out, i.e., the melt temperature, can range from 150 to 300° C. depending on the particular polymer being processed. Preferably, however, densification is carried out at a temperature of from about 170 to 270° C. and when the material being densified is polyethylene and the particles being used are also polyethylene, the latter range is especially desirable.

In carrying out the improved process disclosed herein, various additives may be added to the continuous mixer, if desired, for homogenization with the polyolefin. Such additives include anti-oxidants, slip additives, anti-static agents, fillers, etc.

What is claimed is:

1. In a continuous process for converting solid polyolefin powder having a low bulk density and a size such that it passes through a 60-mesh U.S. standard sieve into heat-plastified and densified masses wherein said polyolefin powder is fed to a continuous mixer and therein heated to fusion in the presence of from 0.1 to 10% by weight of said powder of a liquid to prevent degradation of said polyolefin, said liquid being vaporizable at the temperature of fusion of said polyolefin, the improvement which comprises adding to said mixer polyolefin particles having diameters of from about 0.070 to about 0.130 in. and $L/D$ ratios of from about 0.5 to about 2.0 in an amount from about 0.5 to about 30% by weight of said polyolefin powder fed to said mixer.

2. The process of claim 1 wherein said liquid is present in an amount of from about 0.5 to about 2% by weight of said polyolefin powder.

3. The process of claim 2 wherein said liquid is water.

4. The process of claim 3 wherein the temperature is from 150 to 300° C.

5. The process of claim 4 wherein said polyolefin powder is polyethylene.

6. The process of claim 5 wherein the bulk density of said polyolefin powder is from 11 to 20 lb./ft.$^3$.

7. The process of claim 5 wherein said polyolefin particles are polyethylene.

References Cited

UNITED STATES PATENTS 2,831,846   4/1958   Edmonson et al. _____ 260—94.9
3,063,091  11/1962  Marshall _____ 18—2

JOSEPH L. SCHOFER, Primary Examiner

S. M. LEVIN, Assistant Examiner

U.S. Cl. X.R.

260—41, 94.9